United States Patent [19]

Daniels et al.

[11] Patent Number: 5,769,488
[45] Date of Patent: Jun. 23, 1998

[54] SELECTIVELY DEFORMABLE SEAT

[75] Inventors: Jerry Daniels; Michael E. Simonson, both of Ooltewah, Tenn.

[73] Assignee: Ooltewah Manufacturing, Inc., Ooltewah, Tenn.

[21] Appl. No.: 869,373

[22] Filed: Jun. 5, 1997

Related U.S. Application Data

[63] Continuation-in-part of Ser. No. 615,615, Mar. 13, 1996, Pat. No. 5,711,573.

[51] Int. Cl.$^6$ ..................................................... B62J 1/26
[52] U.S. Cl. ....................... 297/199; 297/284.6; 297/204
[58] Field of Search ................................. 297/199, 284.6, 297/204, 200, 214, 284.1, 284.2, DIG. 3

[56] References Cited

U.S. PATENT DOCUMENTS

| | | | |
|---|---|---|---|
| 3,758,153 | 9/1973 | Bonikowsky | 297/199 |
| 4,960,304 | 10/1990 | Frantz | 297/284.6 |
| 5,353,734 | 10/1994 | Tani | 297/199 X |

FOREIGN PATENT DOCUMENTS

| | | | |
|---|---|---|---|
| 2306866 | 4/1975 | France | 297/199 |
| 6884 | of 1897 | United Kingdom | 297/199 |

*Primary Examiner*—Laurie K. Cranmer
*Attorney, Agent, or Firm*—Alan Ruderman

[57] ABSTRACT

A motorcycle seat has a shape forming base on which a selectively deformable cushion is positioned and covered by an exterior covering, the cushion having a foam material encased within an airtight bladder. A valve member located externally of the covering has a conduit which extends through the bladder in sealed fashion and terminates within the foam material. The valve may be selectively opened, and when open while a compression force is applied on the foam, air is expelled from the foam, and if the valve is then closed the foam is formed into the shape of the force applicator. With the valve closed, movement upon the cushion redistributes the air within the foam accordingly. When the compression force is relieved and the valve is opened, the cushion takes on its original shape. A slow release bleed-back valve communicates the interior of the foam with ambient environment to permit air to gradually flow back into the foam in the event the operator fails to open the first mentioned valve after disembarking from the seat.

8 Claims, 2 Drawing Sheets

SELECTIVELY DEFORMABLE SEAT

REFERENCE TO RELATED APPLICATIONS

This application is a continuation in part of U.S. application Ser. No. 08/615,615, filed Mar. 13, 1996, now U.S. Pat. No. 5,711,573.

BACKGROUND OF THE INVENTION

This invention relates to seats which may be selectively deformed to the shape of the user and more particularly to a seat which may be deformed selectively to permit evacuation of the air therein upon forcible compression of the seat and to permit re-entry of the air upon release of the compression force or to prevent the re-entry of the air to maintain the deformed shape.

It is known to provide a seat with a resilient foam cushion encased within a covering. When one sits on such a seat the foam cushioning compresses as air is expelled from the cells of the foam. The air either exits through the cover itself or leaks out of the cover since the covers are porous and in any event are not air tight. Thereafter when the compression is released from the seat by the person getting up, the seat reforms by air re-entering the cells of the foam until the foam looses its resiliency and is no longer effectively compressible, i.e., no longer holds its original uncompressed shape. When such a foam is applied to the rigid base of a seat, such as the seat of a motorcycle, the cushioning effect is minimal after the user has been seated on the seat for some time. The same is true in regard to other seats including those in automobiles, wheel chairs, stadium cushions, office chairs and the like. The air is evacuated and the rigid base beneath it provides the support. Most of such seats are thus very hard, and the position of the seated person is fixed. In regard to a motorcycle, there is no adjustability in the height of the seat provided by the seat itself. The pressure points of the rider's body on the seat thus remain stationary and during extended travel the rider's legs and buttocks may become numb and the legs may "fall asleep." The reason for this is that the soft tissues of the buttocks spreads and the pelvis or bony prominences settle resulting in capillary closing which occurs at about 32 mm. of mercury.

In our aforesaid copending U.S. application Ser. No. 08/615,615 a motorcycle seat having a deformable seat cushion is disclosed which comprises a plastic foam material encased within an air tight skin and a valve member located externally of the seat and communicating in sealed relationship through the skin into the foam so that when the valve is open and a compression force is applied to the foam, such as by a person sitting on the seat, air is evacuated and the seat conforms to the shape of the user's buttocks. When the valve is opened and the person disembarks from the seat, air re-enters the cells of the foam to reshape the seat to its original shape.

One problem which has surfaced in use of this construction with motorcycle seats is that the cyclists tend to forget to re-inflate the seat when disembarking. When the foam is compressed to a shape and is maintained in the compressed shape over a relatively long period time, the foam loses its "memory," that is it loses its ability to return to its initial state, and eventually will not return to its original uncompressed configuration. This, to some extent, defeats the adjustability feature of the selectively deformable set disclosed in the aforesaid copending patent application.

SUMMARY OF THE INVENTION

Consequently, it is a primary object of the present invention to provide a motorcycle seat having a foam cushion which permits air to be evacuated from and returned into the cells of the foam selectively and additionally provides a means for permitting air to re-enter the cells of the foam without manual assistance.

It is another object of the present invention to provide a seat for a motorcycle which permits a rider to vary the pressure points of the rider's body on the seat by distributing the air within the seat selectively so that the position of the rider's lower limbs may be periodically changed, and additionally automatically permits air to re-enter the seat after the rider has disembarked from the seat.

It is a further object of the present invention to provide a seat for a motorcycle having a first valve for permitting air to be evacuated from and returned to the interior of the seat selectively to vary the pressure points on the body of the cyclist and a second valve that permits air to enter into the interior of the seat when the first valve is closed and no one is on the seat, but which prevents air from exhausting from he interior of the seat.

Accordingly, the present invention provides a seat including a shape forming base on which a selectively deformable cushion is disposed and covered by an exterior covering. The cushion comprises a plastic foam material encased within an airtight skin or bladder and a valve member located externally of the covering and communicating in sealed relationship through the skin into the foam. Thus, the air within the foam may only exit the foam when the valve is open while a compressible force is applied to the foam. When a person sits on the seat and opens the valve, air within the cells of the foam is expelled in accordance with the force applied by the contacting members of the person. The seat shapes itself to the shape of the user's buttocks in the initial seating position, but the air within the seat may be redistributed as the seated person changes position with the valve closed. This permits the pressure points of the user on the seat to be distributed evenly. Additionally, air may be either further exhausted when the user changes positions and opens the valve, or air may re-enter the cells of the foam when the valve is open and the force due to the weight of the user is released from the foam. Since the air may be selectively exhausted and retained by the cells of the foam, a seat of this construction permits an adjustability to the height of the seat relative to the ground. Additionally a second valve member permits air to enter into but not exit from the foam. This valve is provided to re-inflate the cushion gradually in the event that the user fails to open or actuate the first valve after disembarking from the seat. Thus, the second valve acts to permit air to enter into the foam to prevent loss of "memory" of the foam over time. The cushion may be used for substantially any type of seat, including the seats of a motorcycle. A motorcycle seat having this construction permits the rider to have a greater cushioning effect on the road and permits more air to be exhausted selectively when used in the city where there is frequent stoppage and the rider's feet more frequently engage the ground. It is not necessary for the rider when disembarking from the seat to do anything different compared to prior art seats. Thus, cyclists who out of habit forget to open the first valve when disembarking from the seat will not cause the foam within the seat to lose its memory.

BRIEF DESCRIPTION OF THE DRAWINGS

The invention will be described in conjunction with a motorcycle seat and particular features and advantages of the invention as well as other objects are applicable to other seats and will become apparent from the following description taken in connection with the accompanying drawings in which.

DESCRIPTION OF THE PREFERRED EMBODIMENT

Figure 1:
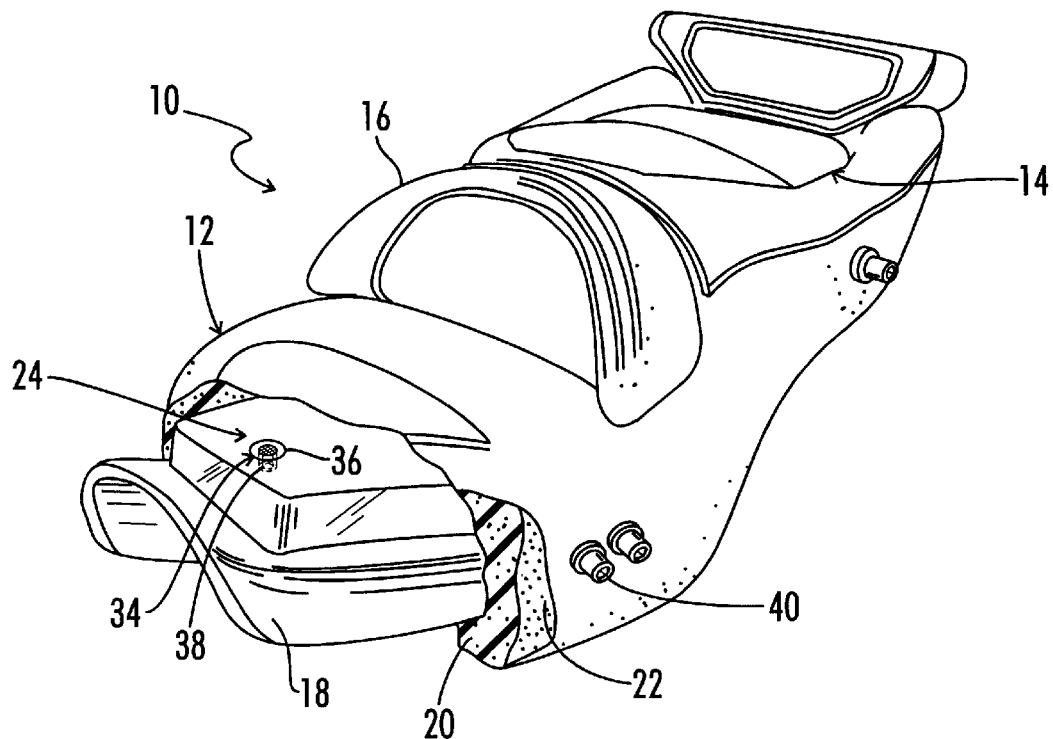
FIG. 1 is a perspective view partly broken away illustrating a motorcycle seat incorporating cushioning constructed in accordance with the principles of the present invention.

Referring to the drawings, FIG. 1 illustrates a motorcycle seat 10 for two people, the driver seat 12 being illustrated as partly broken away. Conventionally, the passenger's seat 14 is located behind the driver's seat 12 which has a back support portion 16. The entire seat 10 has a rigid base portion 18 having a substantially inverted U-shape cross sectional configuration over which cushioning material 20 such as foam or the like conventionally is disposed and an exterior covering 22 of leather, vinyl or the like overlays the cushioning. As aforesaid, conventional seats of this type have a number of problems which create uncomfortable conditions for the riders such as, for example, by not permitting even distribution of the pressure points of the body touching the seat. Thus, as illustrated, in accordance with the present invention a portion of the conventional cushioning material 20 is removed from the interior of the seat and replaced by a unique cushion 24 construction which may be selectively deformed by permitting air within the foam to be removed and distributed selectively.

Figure 2:
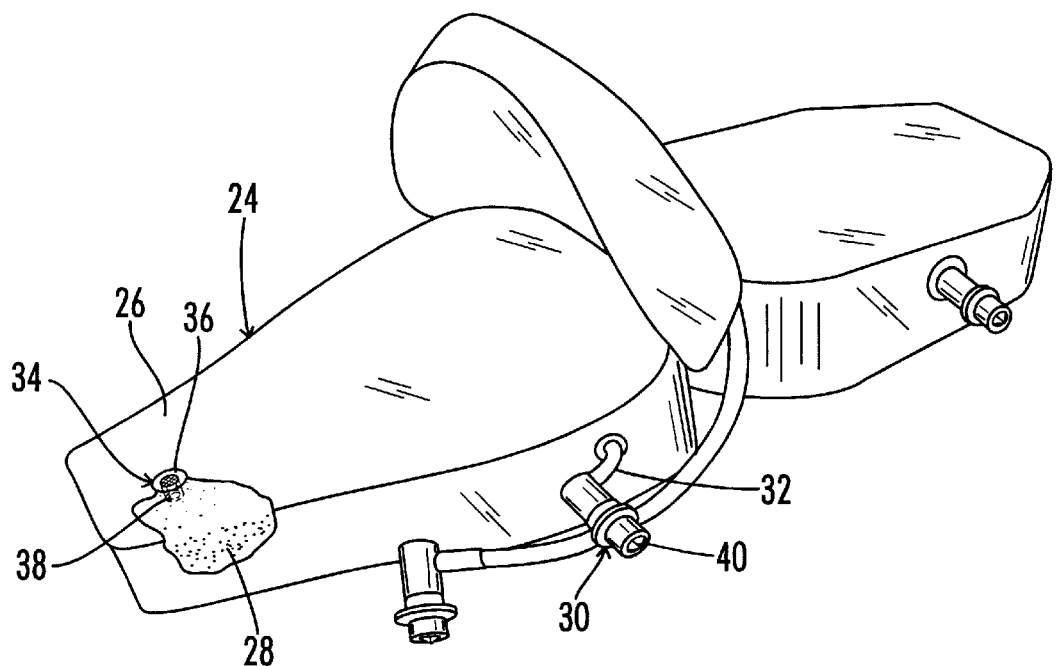
FIG. 2 is a perspective view illustrating the cushioning structure of the seat illustrated in FIG. 1.

As illustrated in FIG. 2, the cushion 24 comprises an outer skin or bladder 26 comprising an air impermeable material such as polyurethane sheeting which encloses an interior cushioning material 28 able to hold and release air. The cushioning material 28 is a multi-cellular foam preferably a urethane foam which may be compressed with relative ease. As the foam is compressed air within the cells is expelled, and when the compression on the foam is released air re-enters the cells of the foam.

Figure 3:
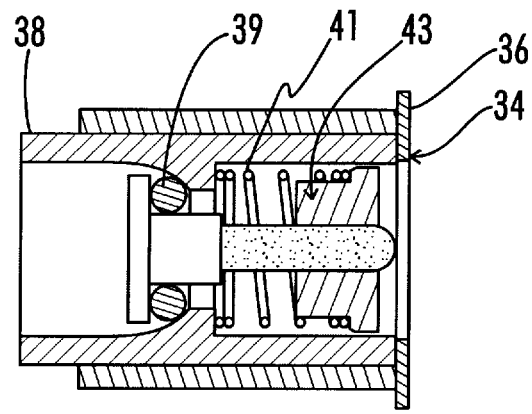
FIG. 3 is a cross sectional view through a bleed-back valve used in the present invention.

In accordance with the present invention, the cushioning material 28 is sealed within the airtight outer skin or bladder 26 except for first and second valve members 30, 34, the first valve 30 including a conduit 32 extending through the bladder 26 in sealed relationship therewith and into the foam cushioning 28. The second valve member 34 has an outer ring 36 that substantially is disposed on the bladder 26 and has a small conduit or outlet portion 38 which extends through the bladder 26 in sealed relationship therewith and into the foam 28. The second valve member 34 is a one-way valve wherein air may flow into the foam from the exterior of the seat, but air cannot flow outwardly through this valve. This valve, as illustrated in FIG. 3, may include an annular or "O" ring 39 that seals the interior of the valve body against flow of air from the interior yet permits air from the space between the bladder and the cushioning material 20 to bleed past the "O" ring 39 and into the foam when the air has been expelled from the foam by the opening of the first valve 30 and the application of the compression force. A small spring 41 acts to bias a movable assembly 43 outwardly to provide small resistance to the movement of the "O" ring 39.

Figure 4:
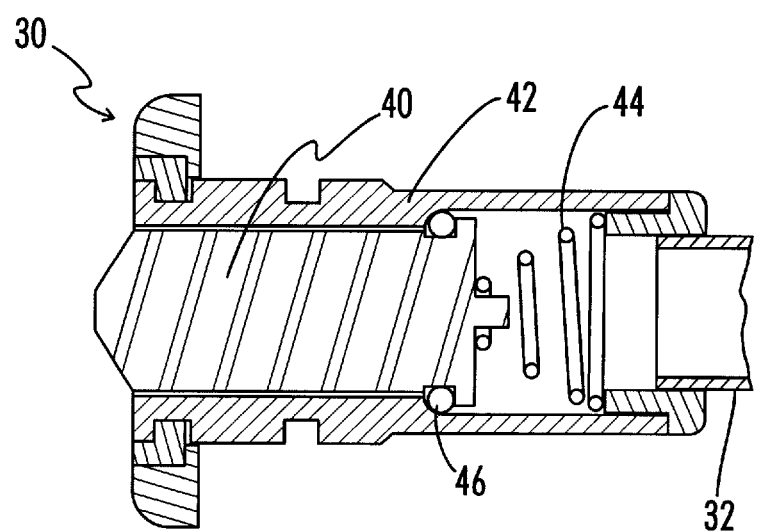
FIG. 4 is a cross sectional view through a manually actuated valve used in the present invention.

The first valve member 30, as illustrated in FIG. 4, includes an actuating piston or plunger member 40 which is urged outwardly from the body 42 of the first valve member 30 by a spring 44 to seal the valve by means of an "O" ring 46 to shut communication between the air outside the seat and the conduit at the outlet of the valve, and thus the foam. When the plunger 40 is depressed to overcome the urging of the spring, the "O" ring moves with the plunger and opens communication between the conduit and ambient conditions, and air may exit or enter from between the plunger and the valve body and through the conduit 32 from or into the foam. The passenger's seat 14 and also the back support 16 may also have deformable structure including valving such as that just described. Although the valves have been described in detail, neither per se form the subject matter of the present invention, but merely exemplify valves that may be utilized in the present invention. When a person sits on the seat and depresses the plunger 40 air within the cells of the foam where compressed at the points of engagement by the person's body, is expelled from the foam and the foam re-forms to the shape of the person in accordance with the compression points, for example, the shape of the person's buttocks. The plunger 40 may then be released and the foam will remain in that shape. As the person shifts about without depression of the plunger to let air in or out, the air within the cells is repositioned within the foam since the air cannot escape from the bladder but can only be repositioned within the cells as the pressure points of the person shift. Lateral support is thus provided to the person and the soft tissues of the buttocks remain tucked in under the bony prominences and prevents pressure on the bones from increasing with time, i.e., the seat provides resistance against the tendency of the soft tissues spreading aside and keeps some of the tissue tucked in under the pelvis. The pressure points are thus evenly distributed as the user changes position.

Extensive testing bears out the fact that pressures on the buttocks are reduced and capillary closing is substantially reduced. Moreover, the position and angles of the person's legs may be changed periodically for comfort. Additionally, by opening the valve again and lifting off the seat, air may re-enter other cells of the foam to further inflate the bladder so that the height of the seat relative to the ground may be varied selectively. A motorcyclist may desire more cushioning on the road, and less cushioning in the city where his or her feet will engage the ground more frequently. This may be readily accomplished with the present invention. After the motorcyclist disembarks from the seat he or she should depress the plunger 40 to permit air to enter and fully inflate the bladder of the cushion. However, it has been found that most cyclist either are forgetful or expect to be back on the seat shortly and thus do not depress the plunger 40 after disembarking. As aforesaid, if this occurs and if the foam remains in a compressed condition for a period of time, it loses its ability to return to its initial state, i.e., it has a memory loss. The second valve 34 eliminates the need to re-inflate the seat by use of the valve 30 by permitting air to slowly bleed into the seat.

Numerous alterations of the structure herein disclosed will suggest themselves to those skilled in the art. However, it is to be understood that the present disclosure relates to the preferred embodiment of the invention which is for purposes of illustration only and not to be construed as a limitation of the invention. All such modifications which do not depart from the spirit of the invention are intended to be included within the scope of the appended claims.

Having thus set forth the nature of the invention, what is claimed herein is:

1. A motorcycle seat including a base having an upper surface, a cushion disposed on the base, and filler material disposed on the cushion and the remainder of the upper surface of the base, and a covering disposed over the seat to enclose the base, the cushion and the filler material and defining the exterior surfaces of the seat, said cushion comprising: a resilient multi-cellular foam material capable of holding air within the cellular structure, an air impermeable bladder disposed about said foam material encasing and sealing said foam material within said bladder, a first valve including a conduit extending through said bladder in sealed relationship therewith and terminating within said foam material, said valve including an operator disposed externally of said covering for opening and closing communication between said conduit and ambient air external of said seat, whereby air selectively may be expelled from said foam material through said conduit when said foam material is compressed by a force on said seat and deformed and air may reenter deformed foam material when compression is relieved, and a second valve having an outlet including a portion extending through said bladder in sealed relationship therewith and communicating with the foam and an inlet opening outside said bladder, said second valve having means for permitting air to bleed from said inlet through said outlet slowly to inflate said bladder after air in said bladder has been expelled so as to prevent said foam from remaining in a compressed state for an excessive period of time after said compression force is removed.

2. A seat as recited in claim 1, wherein said foam material is urethane.

3. A seat as recited in claim 1, wherein said bladder comprises polyurethane sheet material.

4. A seat as recited in claim 3, wherein said foam material is urethane.

5. A motorcycle seat including a base having an upper surface, a cushion disposed on the base, and filler material disposed on the cushion and a remainder of the upper surface of the base, and a covering disposed over the seat to enclose the base, the cushion and the filler material and defining the exterior surfaces of the seat, said cushion comprising: a resilient multi-cellular foam material capable of holding air within the cellular structure, an air impermeable bladder disposed about said foam material encasing and sealing said foam material within said bladder, a first valve having an outlet extending through said bladder in sealed relationship therewith and communicating with said foam material, an inlet disposed externally of said seat and having a manually controllable operator permitting said valve to open and communicate ambient air with said foam material to permit air within said foam to be expelled when a compressive force is applied to said seat and said valve is open, and to permit air to return into said foam when said valve is open and the compression force has been removed, and a second valve having an outlet communicating with said foam and an inlet disposed externally of said bladder for automatically permitting air to flow into said foam when no compression force is on said seat and said first valve is closed.

6. A seat as recited in claim 5, wherein said foam material is urethane.

7. A seat as recited in claim 5, wherein said bladder comprises polyurethane sheet material.

8. A seat as recited in claim 7, wherein said foam material is urethane.

* * * * *